(12) United States Patent
Stefanutti et al.

(10) Patent No.: US 9,458,894 B2
(45) Date of Patent: Oct. 4, 2016

(54) FRICTION MATERIAL HAVING CUSTOMIZABLE WORKING SURFACE AND METHOD OF FORMING THE SAME

(71) Applicant: NATIONAL COATING CORPORATION, Rockland, MA (US)

(72) Inventors: Paul A. Stefanutti, West Bloomfield, MI (US); Robin Mailloux-Morin, Hanson, MA (US)

(73) Assignee: NATIONAL COATING CORPORATION, Rockland, MA (US)

( * ) Notice: Subject to any disclaimer, the term of this patent is extended or adjusted under 35 U.S.C. 154(b) by 0 days.

(21) Appl. No.: 14/698,325

(22) Filed: Apr. 28, 2015

(65) Prior Publication Data

US 2015/0308531 A1   Oct. 29, 2015

Related U.S. Application Data

(60) Provisional application No. 61/985,646, filed on Apr. 29, 2014.

(51) Int. Cl.

| | | |
|---|---|---|
| B32B 3/02 | (2006.01) |
| F16D 23/02 | (2006.01) |
| F16D 69/00 | (2006.01) |
| F16D 65/18 | (2006.01) |
| F16D 121/04 | (2012.01) |
| F16D 123/00 | (2012.01) |

(52) U.S. Cl.
CPC ............ *F16D 23/025* (2013.01); *F16D 65/186* (2013.01); *F16D 69/00* (2013.01); *F16D 2069/004* (2013.01); *F16D 2121/04* (2013.01); *F16D 2123/00* (2013.01); *F16D 2250/0046* (2013.01); *F16D 2300/10* (2013.01)

(58) Field of Classification Search
CPC ................... Y10T 428/12; Y10T 428/12243; Y10T 428/12014; F16D 69/00; F16D 2250/0046; F16D 2069/004; F16D 2300/10
See application file for complete search history.

(56) References Cited

U.S. PATENT DOCUMENTS 6,352,758 B1 * 3/2002 Huang .................... B05D 3/06
264/482

(Continued)

FOREIGN PATENT DOCUMENTS

| | | | |
|---|---|---|---|
| EP | 0486693 A1 * | 5/1992 | ............ F16D 13/64 |
| JP | 11193842 | 7/1999 | |

(Continued)

OTHER PUBLICATIONS

EP 0486693 Machine Translation.*

(Continued)

*Primary Examiner* — Prashant J Khatri
*Assistant Examiner* — Travis Figg
(74) *Attorney, Agent, or Firm* — Carlson, Gaskey & Olds P.C.

(57) ABSTRACT

One exemplary aspect of the present disclosure relates to a method of forming a friction material. The method includes depositing a plurality of particles on a substrate such that the particles provide a plurality of projections and channels between adjacent projections. This disclosure also relates to the friction material itself, and a system including a mechanical component and the friction material.

24 Claims, 2 Drawing Sheets

(56) References Cited

U.S. PATENT DOCUMENTS

| | | | |
|---|---|---|---|
| 6,524,681 B1* | 2/2003 | Seitz | D06N 7/00 104/18 |
| 2003/0228423 A1 | 12/2003 | Kawai et al. | |
| 2004/0115477 A1* | 6/2004 | Nesbitt | A47J 36/025 428/692.1 |
| 2010/0078287 A1* | 4/2010 | Gaffney | F16D 69/026 192/107 M |
| 2012/0174747 A1* | 7/2012 | Hummel | F41H 5/0414 89/36.02 |
| 2014/0106126 A1* | 4/2014 | Gaeta | B24D 11/04 428/143 |

FOREIGN PATENT DOCUMENTS

| | | |
|---|---|---|
| JP | 2000055095 A | 2/2000 |
| JP | 2002234951 A | 8/2002 |

OTHER PUBLICATIONS

Definition of Flat.*
Definition of Substantially.*
International Search Report and Written Opinion for International Application No. PCT/US2015/018736 mailed Jun. 18, 2015.

* cited by examiner

FRICTION MATERIAL HAVING CUSTOMIZABLE WORKING SURFACE AND METHOD OF FORMING THE SAME

RELATED APPLICATIONS

This application claims the benefit of U.S. Provisional Application No. 61/985,646, filed Apr. 29, 2014, the entirety of which is herein incorporated by reference.

BACKGROUND

Friction materials used in high torque applications need to withstand high temperatures. One example application is in the context of synchronizer rings, which are commonly found in manual and dual clutch transmissions. Synchronizer rings are known to include an outer surface having a plurality of gear teeth, and an inner surface having a friction material bonded thereto by way of an adhesive.

One known type of friction material includes machined (i.e., cut) grooves. These friction materials include a consistent density and surface finish throughout. A second type of known friction material also includes pressed or molded grooves and a consistent surface finish throughout. However, unlike the first type, the material within the pressed/molded grooves has an increased density relative to the adjacent, raised material.

SUMMARY

A method of forming a friction material according to an exemplary aspect of the present disclosure includes, among other things, depositing a plurality of first particles on a substrate such that the particles provide a plurality of projections and channels between adjacent projections, and depositing a plurality of second particles into the channels.

A friction material according to an exemplary aspect of the present disclosure includes, among other things, a plurality of particles of a first material providing alternating first and second sections, a plurality of particles of a second material having different mechanical properties than the first material, and a working surface provided by a plurality of particles of the first material and a plurality of particles of the second material. Further, the plurality of particles of the second material are provided in one of the second sections.

A system according to an exemplary aspect of the present disclosure includes, among other things, a mechanical component and a friction material connected to the mechanical component. The friction material includes a plurality of particles of a first material providing alternating first and second sections, a plurality of particles of a second material having different mechanical properties than the first material, and a working surface provided by a plurality of particles of the first material and a plurality of particles of the second material. Further, the plurality of particles of the second material are provided in one of the second sections.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
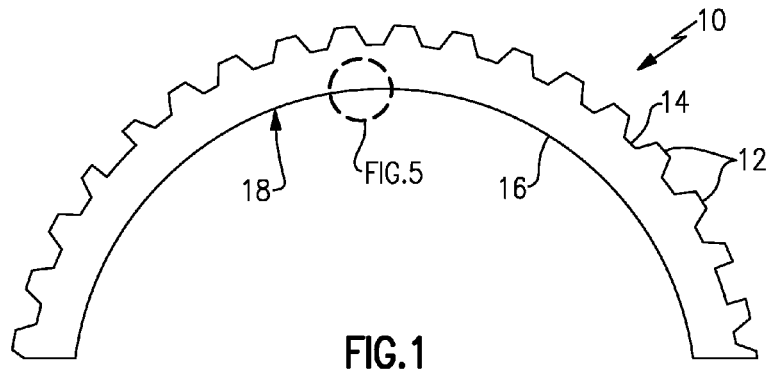
FIG. 1 illustrates an example mechanical component, which in this example is a synchronizer ring.

FIG. 1 illustrates an example mechanical component, which in the illustrated example is a synchronizer ring 10. While a synchronizer ring 10 is illustrated, it should be understood that this disclosure extends beyond synchronizer rings. This disclosure is useful in other applications, such as other high torque applications, including, but not limited to, clutch plates and torque converters.

The synchronizer ring 10 includes a plurality of gear teeth 12 extending from a radially outer surface 14 thereof. During operation, a radially inner surface 16 of the synchronizer ring 10 is exposed to large amounts of heat. The radially inner surface 16 includes a friction material 18 bonded thereto by way of an adhesive. The synchronizer ring 10 may be made of steel or brass, as examples.

Figure 2A:
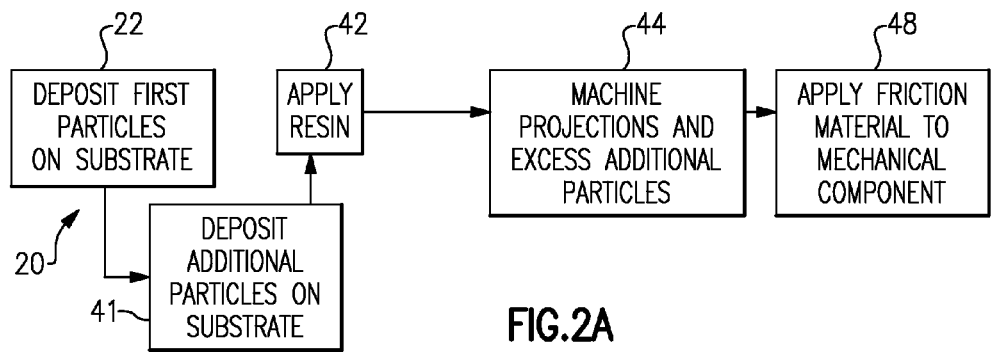
FIG. 2A is a flow chart illustrating an example method of making the disclosed friction material.
Figure 3:
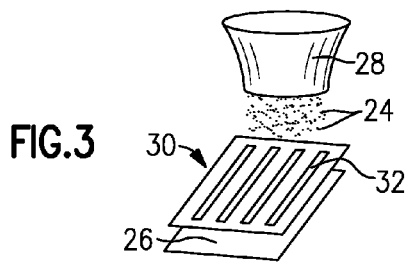
FIG. 3 schematically illustrates a hopper assembly, which may be used in the method of FIGS. 2A-2B.

FIG. 2A illustrates an example method 20 for forming a friction material 18 according to this disclosure. In the method 20, at step 22, a plurality of particles 24 (FIG. 3) are deposited onto a substrate 26. The particles 24 may be selected from any number of materials including carbon, silica, glass, and vermiculite. The substrate 26 may be a carbon fiber weave, paper, textile, aramid, or cloth material, to name a few examples. In one example, the particles 24 are deposited onto the substrate 26 via a hopper 28 and a spreader 30, which includes a plurality of elongate openings 32, as illustrated in FIG. 3. A spreader 30 is not required in all examples.

Figure 4A:
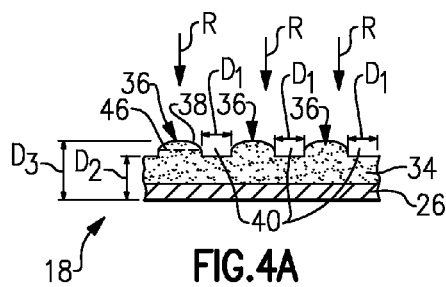
FIGS. 4A-4D are cross-sectional views of the example friction material, and illustrate the friction material at various stages of formation.

The result of step 22 is illustrated in FIG. 4A. In FIG. 4A, the friction material 18 includes the substrate 26 and a working layer 34, which is provided by the particles 24. The working layer 34 includes a plurality of projections 36 opposite the substrate 26. The projections 36 are provided by the accumulation of particles caused by the elongate openings 32 in the spreader 30.

After step 22, the projections 36 are naturally provided with a rounded contour 38. Further, the projections 36 are spaced-apart by a distance $D_1$. The distance $D_1$ can vary depending on the particular application (e.g., depending on the size of the synchronizer ring 10). In one example, the distance $D_1$ is within a range of 0.1875 to 0.5 inches. In one specific example, $D_1$ is 0.375 inches.

The spaces between adjacent projections 36 define channels 40. At the channels 40, the friction material 18 has a height $D_2$. The height $D_2$ may be relatively small in some examples. In particular, in one example, the distance $D_2$ may be such that the boundary of the channels 40 is provided by the substrate 26. On the other hand, the friction material 18 has a height $D_3$ at the rounded contour 38 of the projections 36. The distance $D_3$ is greater than the distance $D_2$.

After step 22, additional particles 39 are applied to the friction material 18 to essentially fill in the channels 40, at 41. The particles 24 and 39 have different mechanical properties, and may even be provided by different materials in some examples. The particles 39 may be carbon, silica, glass, and vermiculite, to name a few examples. The particles 39 may be applied in the channels 40 in a number of different ways, two examples of which are discussed below.

Figure 4B:
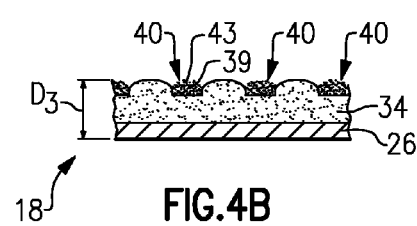

In one example, as shown in FIG. 4B, the additional particles 39 are directed into the channels 40 by a spreader, such as the spreader 30. For instance, after the particles 24 are deposited on the substrate 26, the spreader 30 could be laterally shifted to align the openings 32 with the channels 40. The hopper 28 would then be filled with the additional particles 39, and would deposit the additional particles 39 into the channels 40. In this case, the additional particles 39 would fill the channels 40 and have a rounded contour 43 projecting to the height $D_3$.

Figure 4C:
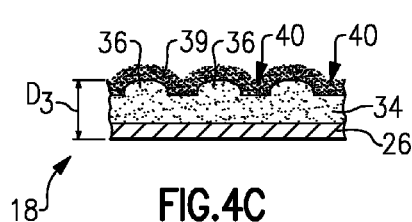

Alternatively, the additional particles 39 would be applied to the friction material 18 in a uniform thickness, as shown in FIG. 4C. Within the channels 40, the additional particles 39 may extend to a height $D_3$. Alternatively, the additional particles 39 would extend to a height slightly below $D_3$ within the channels 40.

Figure 2B:
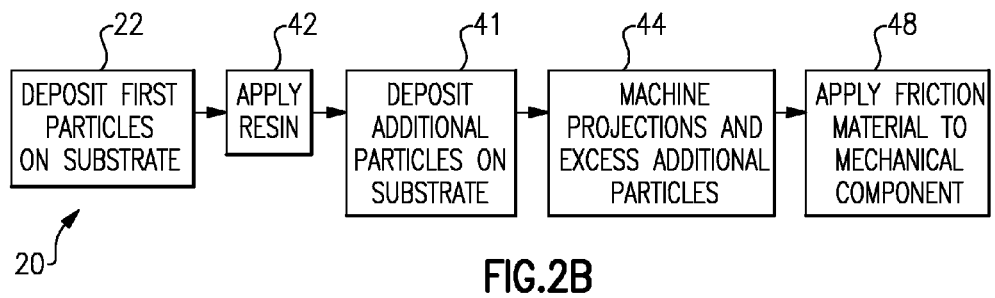
FIG. 2B is a flow chart illustrating another example method of making the disclosed friction material.

After step 41, a resin R (schematically shown in FIG. 4A) is applied to the friction material 18, at step 42. The particles 24, 39 absorb the resin R. Step 42 may be repeated to ensure an appropriate level of saturation. Alternatively, as illustrated in FIG. 2B, the additional particles 39 may be applied after the resin R is applied to the particles 24.

Figure 4D:
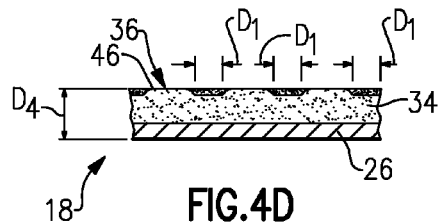

At step 44, the projections 36 and the additional particles 39 are machined (e.g., sanded) to essentially flatten the previously rounded contours 38, 43, or, in the example of FIG. 4C, to remove the excess additional particles 39, such as those particles 39 provided on the projections 36. The flattened height of the friction material 18 is shown at $D_4$ in FIG. 4D. The height $D_4$ is less than $D_3$ and greater than $D_2$ in one example. FIG. 4A shows, in phantom, the flat contour 46 of the projections 36. FIG. 4D shows the machined projections 36 and the machined additional particles 39 exhibiting the flat contour 46.

At step 48, the friction material 18 is applied to the mechanical component, which in this example is the synchronizer ring 10. Again, it should be understood that this disclosure extends to other mechanical components, such as clutch plates.

Figure 5:
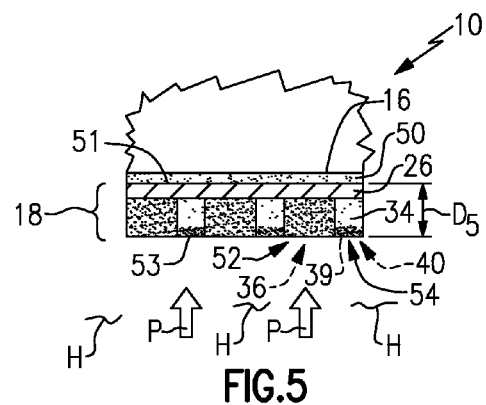
FIG. 5 is a close-up view of the encircled area in FIG. 1.

In one example, which is schematically illustrated in FIG. 5, the friction material 18 is bonded to the radially inner surface 16 of the synchronizer ring 10 by an adhesive layer 50. Heat H and pressure P are applied to the friction material 18, the adhesive layer 50, and the synchronizer ring 10 to ensure a proper bond. The adhesive layer 50 may be any known type of adhesive suitable for high temperature applications. The adhesive layer 50 is provided between an outer surface 51 of the friction material 18, which is opposite a radially inner working surface 53 of the friction material 18.

The result of step 48 is shown in FIG. 5. In FIG. 5, the friction material 18 has a substantially uniform height $D_5$ throughout. The height $D_5$ in one example is less than or equal to the height $D_2$.

When compressed, the friction material 18 has alternating first sections 52 and second sections 54. In this example, the first sections 52 correspond to locations where the projections 36 were provided (projections 36 are illustrated in phantom in FIG. 5). The second sections 54, on the other hand, correspond to locations where the channels 40 and additional particles 39 were provided (additional particles 39 and channels 40 are shown in phantom in FIG. 5). Thus, the additional particles 39 are provided in the second sections 54 and groups of the additional particles 39 (e.g., particles corresponding to a particular one of the channels 40) are spaced-apart from one another by the first sections 52.

Because of the machining from step 44 and the different properties of the particles 24, 39, the first sections 52 may have a first surface finish which is different than the surface finish of the second sections 54. By providing the different first and second sections 52, 54, the friction material 18 exhibits good wear characteristics because of the relatively smooth working surface 53. In the example of a clutch plate, the friction material 18 would be provided on a face of a clutch plate, and the working surface 53 would be in contact with a second mechanical component, such as an adjacent clutch element, during operation. In particular, given the substantially flat and smooth nature of the working surface 53, the second mechanical component is in contact with both the first and second sections 52, 54 during operation. Further, the friction material 18 also exhibits good friction properties because of the different friction properties provided by the different particles 24, 39 at the working surface. The material providing the particles 24, 39 may be selected to increase the effectiveness of the friction material 18 as it relates to cold shifting, for example, or any other desired application. Essentially, the materials can be selected to customize the friction properties of the working surface 53.

Additionally, the first section 52 and second section 54 will likely have different densities because the particles 24, 39 have different mechanical properties. Thus, cooling fluid will be allowed to permeate through the friction material 18 via the relatively lower density sections, which increases the cooling of the synchronizer ring 10 and the friction material 18 itself. This increase in cooling in turn increases performance of the synchronizer ring, and extends the life of both the mechanical component and the friction material.

In the example of FIG. 3, the openings 32 are linear openings, which extend parallel to one another. This provides the friction material 18 with a plurality of linear, parallel first and second sections 52, 54. Other patterns, such as zig-zags, come within the scope of this disclosure, however. While parallel first and second sections 52, 54 are mentioned above, the first and second sections 52, 54 may not be parallel when applied to the radially inner surface 16 of the synchronizer ring 10, as the radially inner surface 16 may be conical.

Further, whereas the examples of FIGS. 4B and 4C show each of the channels 40 filled with additional particles 39, it should be understood that in some examples only certain of the channels 40 are filled with additional particles 39. Further, the channels 40 may be filled with additional particles 39 provided by more than one type of material. That is, one channel 40 could be filled with a first type of particles, and the adjacent channels 40 could be filled with particles provided by different materials, as appropriate for a given application.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A friction material, comprising:
a plurality of particles of a first material providing alternating first and second sections;
a plurality of particles of a second material having different mechanical properties than the first material, the plurality of particles of the second material provided in one of the second sections; and
a working surface provided by a plurality of particles of the first material and a plurality of particles of the second material, wherein the working surface is substantially flat, the working surface having a first surface finish and a first density within the first sections and having, within the second sections, a second surface finish different than the first surface finish and a second density different than the first density, and wherein the first and second sections have substantially the same height;
wherein the friction material has a first height;
wherein the first sections are provided entirely by a plurality of particles of the first material throughout the first height;
wherein the second sections are provided by a plurality of particles of the first material throughout a second height less than the first height, and provided by a plurality of particles of the second material throughout a third height, wherein the third height is a difference between the first height and the second height.

2. The friction material as recited in claim 1, further comprising:
a substrate, wherein the plurality of particles of the first material and the plurality of particles of the second material are applied to the substrate.

3. The friction material as recited in claim 2, wherein the friction material is applied to one of a synchronizer ring, a clutch plate, and a torque converter.

4. The friction material as recited in claim 1, wherein the first and second sections are filled only by particles and resin.

5. The friction material as recited in claim 1, wherein the first material includes particles and resin, and wherein the second material includes particles and resin.

6. The friction material as recited in claim 1, wherein the first material is different than the second material.

7. The friction material as recited in claim 1, wherein each second section is provided, throughout the entirety of each second section, by a plurality of particles of the first material throughout the second height and a plurality of particles of the second material throughout the third height.

8. The friction material as recited in claim 1, wherein the second height is constant throughout each of the second sections.

9. The friction material as recited in claim 1, wherein the first and second sections are substantially parallel to one another.

10. The friction material as recited in claim 1, wherein the plurality of particles of the first material are provided throughout the entirety of each of the second sections.

11. A system, comprising:
a first mechanical component;
a second mechanical component;
a friction material connected to the first mechanical component, the friction material comprising:
a plurality of particles of a first material providing alternating first and second sections;
a plurality of particles of a second material having different mechanical properties than the first material, the plurality of particles of the second material provided in one of the second sections; and
a working surface provided by a plurality of particles of the first material and a plurality of particles of the second material, wherein the working surface is substantially flat, the working surface having a first surface finish and a first density within the first sections and having, within the second sections, a second surface finish different than the first surface finish and a second density different than the first density;
wherein the friction material has a first height;
wherein the first sections are provided entirely by a plurality of particles of the first material throughout the first height;
wherein the second sections are provided by a plurality of particles of the first material throughout a second height less than the first height, and provided by a plurality of particles of the second material throughout a third height, wherein the third height is a difference between the first height and the second height.

12. The system as recited in claim 11, further comprising:
a substrate, wherein the plurality of particles of the first material and the plurality of particles of the second material are applied to the substrate.

13. The system as recited in claim 12, wherein the mechanical component is one of a synchronizer ring, a clutch plate, and a torque converter.

14. The system as recited in claim 11, wherein the working surface is substantially flat and is a continuous, uninterrupted surface.

15. The system as recited in claim 11, wherein the first and second sections are filled only by particles and resin.

16. The system as recited in claim 11, wherein each second section is provided, throughout the entirety of each second section, by a plurality of particles of the first material throughout the second height and a plurality of particles of the second material throughout the third height.

17. The system as recited in claim 11, wherein the second height is constant throughout each of the second sections.

18. The system as recited in claim 11, wherein the first and second sections are substantially parallel to one another.

19. The system as recited in claim 11, wherein the plurality of particles of the first material are provided throughout the entirety of each of the second sections.

20. A friction material, comprising:
a working layer provided by a plurality of particles, the working layer including a first section having a first surface finish and a first density, the working layer further including a second section having a second surface finish different than the first surface finish and a second density different than the first density, wherein the working layer is substantially flat and the first and second sections have substantially the same height;
wherein the friction material has a first height;
wherein the first section is provided entirely by a plurality of particles of a first material throughout the first height;
wherein the second section is provided by a plurality of particles of the first material throughout a second height less than the first height, and provided by a plurality of particles of a second material throughout a third height, the second material having different mechanical properties than the first material, wherein the third height is a difference between the first height and the second height.

21. The friction material as recited in claim 20, further comprising:
a substrate, the plurality of particles applied to the substrate.

22. The friction material as recited in claim 20, wherein the working layer includes a plurality of first sections and a plurality of second sections.

23. The friction material as recited in claim 22, wherein the first and second sections are provided in an alternating arrangement.

24. The friction material as recited in claim 20, wherein the friction material is provided on one of a synchronizer ring, a clutch plate, and a torque converter.

* * * * *